(12) United States Patent
Chang

(10) Patent No.: US 7,675,687 B2
(45) Date of Patent: Mar. 9, 2010

(54) LIQUID LENS GROUP

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/202,543

(22) Filed: Sep. 2, 2008

(65) Prior Publication Data
US 2009/0147372 A1    Jun. 11, 2009

(30) Foreign Application Priority Data
Dec. 11, 2007    (CN) .................... 2007 1 0202990

(51) Int. Cl.
*G02B 1/06*    (2006.01)
*G02B 3/12*    (2006.01)

(52) U.S. Cl. ...................................... 359/665; 359/666

(58) Field of Classification Search ................. 359/665, 359/666
See application file for complete search history.

(56) References Cited

U.S. PATENT DOCUMENTS

| 60,109 | A | * | 11/1866 | Woodward ................. 359/665 |
| 7,230,771 | B2 | * | 6/2007 | Kuiper et al. ............... 359/665 |
| 7,242,528 | B2 | * | 7/2007 | Renders et al. ............. 359/665 |
| 2007/0177276 | A1 | * | 8/2007 | Liogier D'ardhuy et al. ..... 359/666 |

* cited by examiner

*Primary Examiner*—William C Choi
(74) *Attorney, Agent, or Firm*—Andrew C. Cheng

(57) ABSTRACT

A liquid lens group includes two liquid lens portions and a light-pervious separator. The light pervious separator includes a first contact surface and an opposite second contact surface, which are in contact with the two liquid lens portions respectively. The liquid lens group has a wide focus range and highly compacted volume.

18 Claims, 4 Drawing Sheets

LIQUID LENS GROUP

BACKGROUND

1. Technical Field

The present invention relates to a liquid lens group.

2. Discussion of Related Art

Currently, various portable electronic devices such as mobile phones, personal digital assistants (PDAs), and laptop computers employ camera modules, typically comprising of a lens group. Generally, a lens group includes several lenses combined together. To capture photos of objects at different distance, there is a need to dynamically change the focus of the lens group. Thus, a lens group usually includes a complex mechanism for changing distances between the lenses to achieve the desired focusing.

However, limited space in micro lens groups confines the motion of lenses to a limited range. As a result, it is very difficult to reduce the volume of micro lens groups while increasing the focus range of micro lens groups simultaneously.

Therefore, an improved lens group is desired to overcome the above-described deficiencies

SUMMARY

A liquid lens group includes two liquid lens portions and a light-pervious separator. The light-pervious separator includes a first contact surface and an opposite second contact surface. The first contact surface and the second contact surface are in contact with the two liquid lens portions, respectively.

This and other features and advantages of the present invention as well as the preferred embodiments thereof and a liquid lens group in accordance with the invention will become apparent from the following detailed description and the descriptions of the drawings.

BRIEF DESCRIPTION OF THE DRAWINGS

Many aspects of the present liquid lens group can be better understood with reference to the following drawings. The components in the drawings are not necessarily drawn to scale, the emphasis instead being placed upon clearly illustrating the principles of the present liquid lens group.

DETAILED DESCRIPTION OF THE EXEMPLARY EMBODIMENTS

Figure 1:
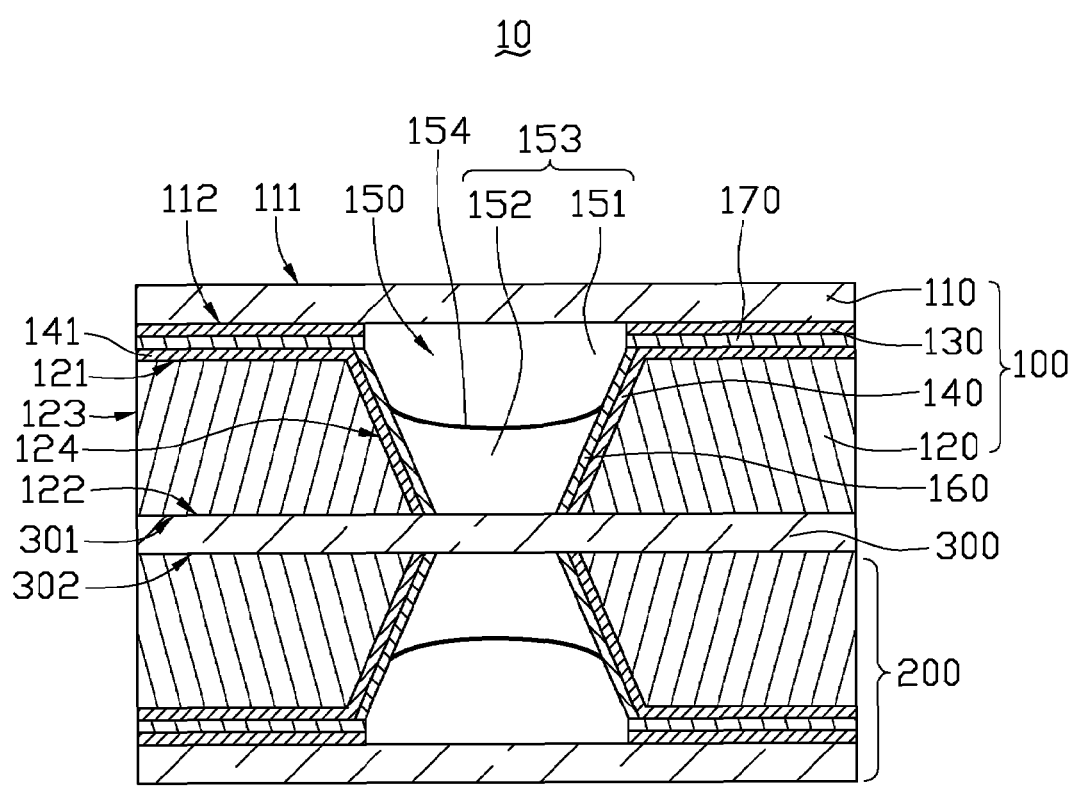
FIG. 1 is a cross sectional view of a first embodiment of a liquid lens group.

Referring to FIG. 1, a first embodiment of a liquid lens group 10 includes a first liquid lens member 100, a second liquid lens member 200, and a separator 300 interposed between the first liquid lens member 100 and the second lens member 200. The separator 300 includes a first contact surface 301 and an opposite second contact surface 302.

In the first embodiment, the first liquid lens member 100 and the second liquid lens member 200 have similar structure. For purposes of brevity, only the structure of the liquid lens member 100 is described in detail as an example.

The first liquid lens member 100 includes a top cover 110, a sealing member 120, a first electrode 130, and a second electrode 140.

The top cover 110 is a sheet of a light-pervious material such as glass and resin. In the first embodiment, the top cover 110 is a flat sheet. In other embodiments, the top cover 110 is structured as a convex lens or a concave lens. The top cover 110 includes a first surface 111 and an opposite second surface 112. In another embodiment, the top cover 110 includes an anti-reflection film formed on the first surface 111 to reduce light loss when light enters the top cover 110.

The sealing member 120 is annular shaped and arranged between the top cover 110 and the separator 300. The sealing member 120 includes a top surface 121, an opposite bottom surface 122, an outer side surface 123 and an inner side surface 124. The top surface 121 faces the top cover 110. The bottom surface 122 is in contact with the first contact surface 301. The outer side surface 123 surrounds the inner side surface 124. The outer and inner side surfaces 123, 124 may be cylindrical shaped or truncated cone-shaped. In the first embodiment, the outer surface is cylindrical shaped and the inner surface is truncated cone-shaped. Two ends of the outer side surface 123 and the inner side surface 124 interconnect the top surface 121 and the bottom surface 122.

The inner side surface 124, the second surface 112 and the first contact surface 301 define a sealed receiving space 150. The sealing member 120 can be made from a silicon sheet or a polymer material such as poly-dimethylbenzene. In the first embodiment, the sealing member 120 is made from a silicon sheet.

The receiving space 150 contains a liquid lens portion 153. The liquid lens portion 153 includes an electrically conductive liquid 151 and an electrically insulative liquid 152. The electrically conductive liquid 151 and the electrically insulative liquid 152 are non-dissolvable and non-wettable to each other, thereby forming an interface 154 between the electrically conductive liquid 151 and the electrically insulative liquid 152. The electrically conductive liquid 151 is in contact with the second surface 112. The electrically insulative liquid 152 is in contact with the first contact surface 301.

The electrically conductive liquid 151 and the electrically insulative liquid 152 are light-pervious and transparent. A density difference between the electrically conductive 151 and the electrically insulative liquid 152 should be less than 0.01 g/cm$^3$. Advantageously, the density of the electrically conductive liquid 151 and the electrically insulative liquid 152 are substantially the same so that the interface 154 between the electrically conductive liquid 151 and the electrically insulative liquid 152 remains stable. Thus, the liquid lens portion 153 composed of the electrically conductive liquid 151 and the electrically insulative liquid 152 has a stable light axis. Examples of the electrically conductive liquid 151 include electrically conductive water solution such as brine and sodium sulfate solution. Examples of the electrically insulative liquid 152 include non-polar liquid such as silicon oil solution or bromododecane solution. In addition, the electrically conductive liquid 151 and the electrically insulative liquid 152 may have similar reflective index such that light reflection loss at the interface 154 between the liquids can be reduced.

The first electrode 130 is formed on the second surface 112 and in contact with the electrically conductive liquid 151. The first electrode 130 can be formed on the second surface 112 using a printing or deposition method. The first electrode 130 may be distributed on the entire second surface 112, or only a portion of the second surface 112. The first electrode 130 can also extend to contact with the first surface 111 because an electrical connection to the first electrode can be easily achieved on the first surface 111. The first electrode 130 can be made from gold, platinum, or indium tin oxide (ITO) in a needle, ball, sheet, or comb shape. In the first embodiment, the first electrode 130 is comb-shaped and formed on a portion of the second surface 112.

The second electrode 140 is formed on the inner side surface 124. The second electrode 140 can be a sheet or comb-shaped. A dielectric layer 160 is formed on the second electrode such that the second electrode 140 is isolated from the electrically conductive liquid 151 and the electrically insulative liquid 152. The dielectric layer 160 can be made with any material that is insulative and non-wettable with water. In the first embodiment, for conveniently electrically connecting the second electrode 140 to an outer circuit, the second electrode 140 is formed on the top surface 121 and on the inner side surface 124 of the sealing member 120. An insulative layer 170 is formed between the first electrode 130 and the first portion 141 of the second electrode 140 to prevent the first electrode 130 from electrically connecting to the second electrode 140.

The first electrode 130 is configured to electrically connect to a positive electrode of the power supply (not shown) and the second electrode 140 is configured for electrically connecting to a negative electrode of a power supply. The interface 154 is capable of maintaining its shape if there is no voltage applied between the first electrode 130 and the second electrode 140. However, due to the electrowetting effect, a contact angle between the electrically conductive liquid 151 and the dielectric layer 160 may change if there is a voltage applied between the first electrode 130 and the second electrode 140.

Figure 2:
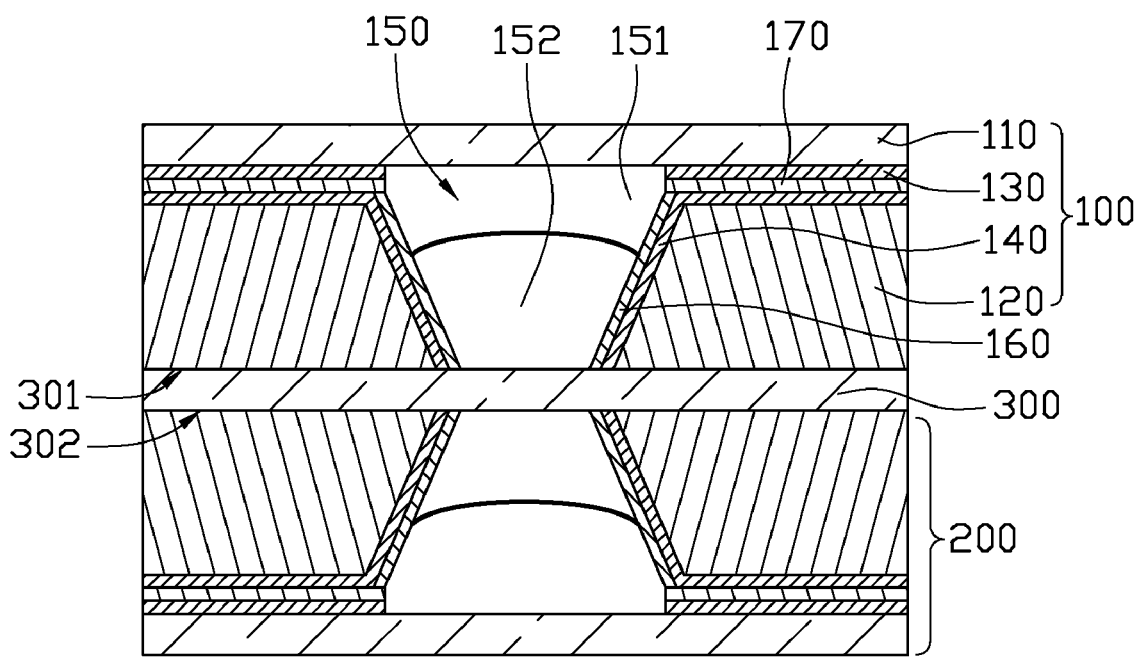
FIG. 2 is a cross sectional view of a second embodiment of the liquid lens group of FIG. 1 shown in an operating state.

Referring to FIG. 2, the shape and curvature of the interface 154 changes due to a voltage applied between the first electrode 130 and the second electrode 140. The curvature of the interface 154 is proportional to the voltage applied between the first electrode 130 and the second electrode 140. Thus, by varying the applied voltage, the curvature of the interface 154 can be adjusted and controlled continuously.

The separator 300 is made of a light-pervious material such as glass and resin. In the first embodiment, the separator 300 is a flat plate. In other embodiments, the separator 300 may be an optical member such as a light filter or an IR-cut filter.

The first liquid lens member 100 and the second liquid lens member 200 do not need to move to focus. In addition, the separator 300 eliminates the need for an additional cover, because the separator 300 serves as the bottom cover of the first liquid lens member 100 and the top cover of the second liquid lens member 200. As a result, the liquid lens group 10 is shorter than a lens group including same amount of solid lenses.

Figure 3:
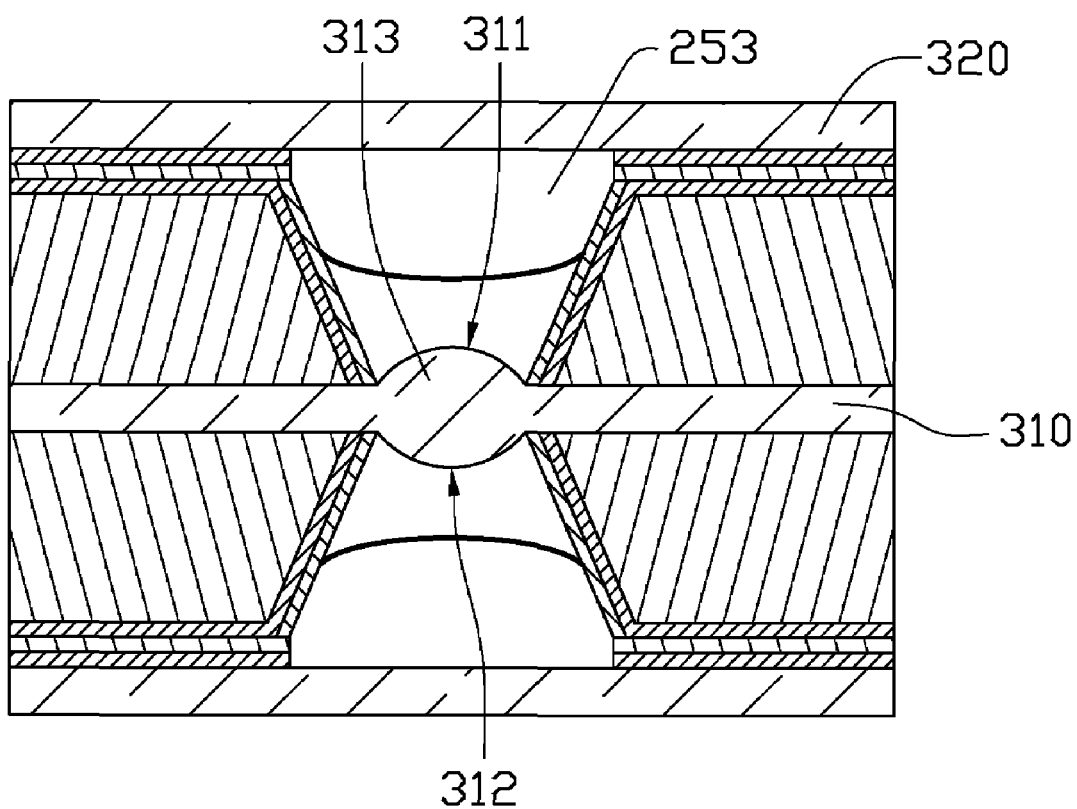
FIG. 3 is a cross sectional view of a second embodiment of the liquid lens group.

Referring to FIG. 3, a second embodiment of a liquid lens group 20 is similar to the liquid lens group 10 of the first embodiment, except that a separator 310 includes a lens portion 313 between the first liquid lens portion 253 and the second liquid lens portion 254. In the second embodiment, the lens portion 313 is a convex lens, and a first and second contact surface 311, 312 are smooth curved surfaces. In another embodiment, the lens portion 313 is a concave lens. In other embodiments, the first and second contact surface 311, 312 are curved surfaces. In another embodiment, a top cover 320 can also serves as a lens.

Figure 4:
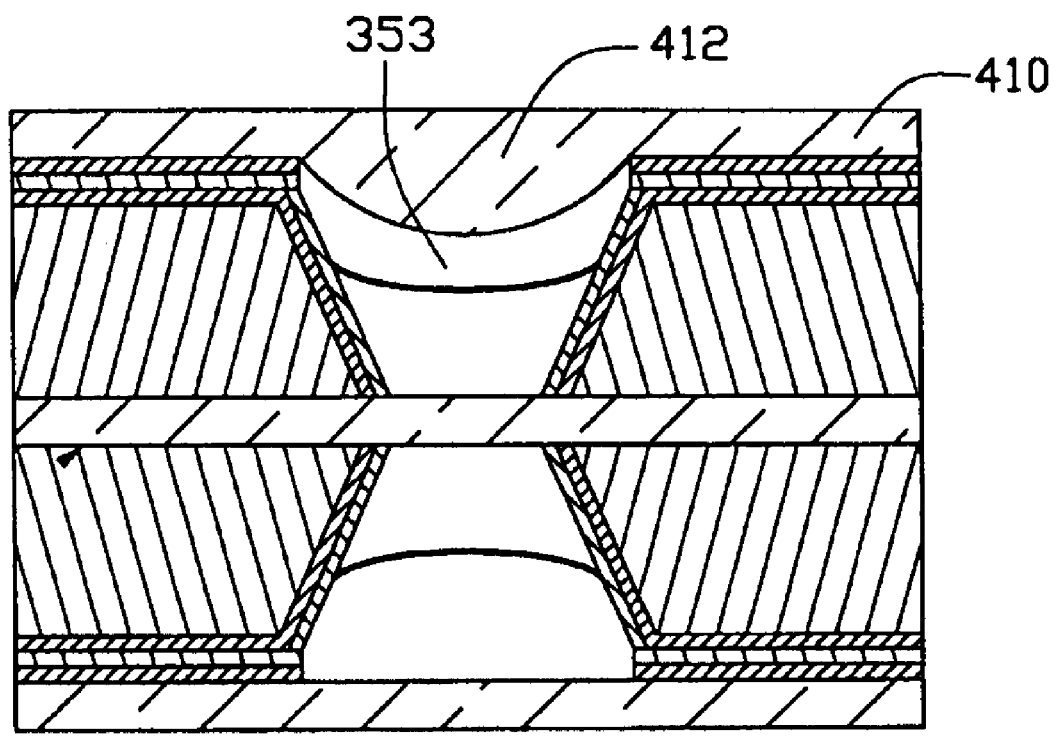
FIG. 4 is a cross sectional view of a third embodiment of the liquid lens group.

Referring to FIG. 4, a third embodiment of a liquid lens group 30 is similar to the liquid lens group 10 of the first embodiment, except that a top cover 410 includes a lens portion 412. The lens portion 412 is opposite to and aligned with the first liquid lens portion 353. The lens portion 412 can be a convex lens or a concave lens. In another embodiment, the top cover 410 can also serves as a lens.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A liquid lens group, comprising:
a first liquid lens member and a second liquid lens member; and
a light-pervious separator arranged between the first liquid lens member and the second liquid lens member, the light-pervious separator comprising a first contact surface and an opposite second contact surface, wherein the first contact surface is in contact with the first liquid lens member and the second contact surface is in contact with the second liquid lens member, wherein the light-pervious separator is a light filter.

2. The liquid lens group of claim 1, wherein the separator is a flat plate.

3. The liquid lens group of claim 1, wherein the separator further comprises a lens portion between the first liquid lens member and the second liquid lens member.

4. The liquid lens group of claim 3, wherein the lens portion is a convex lens.

5. The liquid lens group of claim 3, wherein the lens portion is a concave lens.

6. The liquid lens group of claim 1, wherein the first contact surface is a smoothly curved surface.

7. The liquid lens group of claim 1, wherein the second contact surface is a smoothly curved surface.

8. The liquid lens group of claim 1, wherein the first contact surface and the second contact surface are smoothly curved surfaces.

9. The liquid lens group of claim 1, wherein the light filter is an IR-cut filter.

10. The liquid lens group of claim 1, wherein each of the first liquid lens member and the second liquid lens member further comprises a top cover opposite to the separator, wherein the top cover of the first liquid lens member comprises a top cover lens portion opposite to and aligned with the first liquid lens portion.

11. The liquid lens group of claim 10, wherein each of the first liquid lens member and the second liquid lens member comprises an annular sealing member having a cylindrical or truncated cone-shaped inner side surface.

12. The liquid lens group of claim 11, wherein each of the first and second liquid lens members comprises a first electrode formed on the top cover thereof and a second electrode formed on the inner side surface of the sealing member thereof.

13. The liquid lens group of claim 12, wherein an insulative layer is disposed between the first electrode and the second electrode for electrically isolating the first and second electrodes.

14. A liquid lens group, comprising:
a first liquid lens member;
a second liquid lens member;
an electrically conductive liquid received in the first and second liquid lens member;
an electrically insulative liquid received in the first and second liquid lens member; and
a light-pervious separator arranged between the first liquid lens member and the second liquid lens member, the light-pervious separator comprising a first contact surface and an opposite second contact surface, wherein the first contact surface is in contact with the first liquid lens member and the second contact surface is in contact with the second liquid lens member and wherein the light-pervious separator is a light filter.

15. The liquid lens group of claim 14, wherein the electrically conductive liquid is selected from the group consisting of brine and sodium sulfate solution.

16. The liquid lens groups of claim 14, wherein the electrically insulative liquid is selected from the group consisting of silicon oil solution and bromododecane solution.

17. The liquid lens groups of claim 14, wherein the light filter is an IR-cut filter.

18. The liquid lens groups of claim 14, wherein each of the first liquid lens member and the second liquid lens member comprises a sealing member having a cylindrical or truncated cone-shaped inner side surface, a top cover, a first electrode formed on the top cover, and a second electrode formed on the inner side surface; the sealing member, the top cover, and the light-pervious separator encloses a receiving space receiving the electrically conductive liquid and the electrically insulative liquid therein; the first electrode is connected to the electrically conductive liquid; the second electrode is connected to the electrically insulative liquid.

* * * * *